US012659664B2

(12) United States Patent
Price et al.

(10) Patent No.: US 12,659,664 B2
(45) Date of Patent: Jun. 16, 2026

(54) DEVICE FOR EASILY ADDING A PORTABLE SPEAKER TO AN EXISTING AUTOMOBILE SOUND SYSTEM

(71) Applicant: TRULLI ENGINEERING, LLC, Mundelein, IL (US)

(72) Inventors: Steven Price, Grayslake, IL (US); Jake Maciejewski, Vernon HillS, IL (US); Peter Alexander Tomich, Ingleside, IL (US)

(73) Assignee: TRULLI ENGINEERING, LLC, Mundelein, IL (US)

( * ) Notice: Subject to any disclaimer, the term of this patent is extended or adjusted under 35 U.S.C. 154(b) by 43 days.

(21) Appl. No.: 18/565,343

(22) PCT Filed: Jun. 21, 2022

(86) PCT No.: PCT/US2022/034236
§ 371 (c)(1),
(2) Date: Nov. 29, 2023

(87) PCT Pub. No.: WO2022/271625
PCT Pub. Date: Dec. 29, 2022

(65) Prior Publication Data
US 2024/0267676 A1     Aug. 8, 2024

Related U.S. Application Data

(60) Provisional application No. 63/213,470, filed on Jun. 22, 2021.

(51) Int. Cl.
*H04R 3/12*     (2006.01)
*G06F 3/16*     (2006.01)

(52) U.S. Cl.
CPC .............. *H04R 3/12* (2013.01); *G06F 3/162* (2013.01); *H04R 2420/07* (2013.01); *H04R 2499/13* (2013.01)

(58) Field of Classification Search
CPC .. H04R 3/12; H04R 2420/07; H04R 2499/13; G06F 3/162; H04S 7/301; H04W 4/48; H04W 76/10
See application file for complete search history.

(56) References Cited

U.S. PATENT DOCUMENTS

| | | |
|---|---|---|
| 10,764,683 B2 | 9/2020 | Bal et al. |
| 2011/0116642 A1 | 5/2011 | Hall et al. |

(Continued)

FOREIGN PATENT DOCUMENTS

AU     2017254914 A1     11/2017

OTHER PUBLICATIONS

Supplementary European Search Report for EP22829103.5 mailed Mar. 27, 2025.

*Primary Examiner* — Matthew A Eason
(74) *Attorney, Agent, or Firm* — Clark Hill PLC; James R. Foley

(57) ABSTRACT

A device which is configured to receive a signal from a mobile device, pass that signal through to an automobile head unit, filter out and decode some audio-related information from the signal the device receives from the mobile device, and pass that audio-related information to a portable speaker. Preferably, a delay is calculated and added, either by the device or by the portable speaker, such that audio that emits from the portable speaker is synchronized with audio that emits from the head unit.

20 Claims, 4 Drawing Sheets

(56)         References Cited

U.S. PATENT DOCUMENTS

2019/0215349 A1 *  7/2019  Adams ................. A63F 13/327
2020/0159943 A1    5/2020  Rocci et al.
2020/0336829 A1 * 10/2020  Bal ....................... G06F 3/167
2021/0120509 A1    4/2021  Price et al.

* cited by examiner

Apple Wired Audio without CarPlay

Wireless CarPlay
Infotainment Emulator and
Apple Device Emulator

DEVICE FOR EASILY ADDING A PORTABLE SPEAKER TO AN EXISTING AUTOMOBILE SOUND SYSTEM

RELATED APPLICATION (PRIORITY CLAIM)

The present application is a National Stage filing of PCT/US2022/034236, filed on Jun. 21, 2022, which claims the benefit of U.S. Provisional Application Ser. No. 63/213, 470, filed Jun. 22, 2021, and which is hereby incorporated by reference in its entirety.

BACKGROUND

The present invention generally relates to automobile sound systems, and more specifically relates to a device for easily adding a portable speaker to an existing sound system in an automobile.

Modern automobiles include a main component called a head unit (sometimes called an infotainment system) which is central to the automobile's sound and information systems. The head unit is located prominently in the center of the dashboard or console and provides an integrated electronic package. Specifically, the head unit provides a unified hardware interface, including buttons, screens and system controls for numerous integrated information and entertainment functions. For example, the head unit provides a connection to a mobile device for receiving audio-related information from the mobile device and often provides control of audio functions, such as volume, speaker balance, speaker fade, bass, treble, equalization, etc.

One common way that a head unit connects to a mobile device is via a wireless connection, such as Bluetooth. Some head units are configured to also connect with the mobile device via a wired connection, often through a USB port.

Automobiles come equipped with a sound system that includes a plurality of speakers physically connected to the head unit. Regardless of whether the connection between the mobile device and the head unit is wireless or wired, the connection between the mobile device and the head unit allows the mobile device to play audio through the head unit and therefore also through the automobile's speakers.

Automobiles come equipped with a pre-determined number of speakers built into the doors, dashboard, etc. and head units are built into the dashboard. To add a speaker to an automobile's sound system is no easy task and requires substantial labor, such as dismantling the dashboard to obtain access to the back of the head unit, adding an amplifier, etc.

SUMMARY

One object of an embodiment of the present invention is to provide a device for easily adding a portable speaker to an existing automobile sound system.

Another object of an embodiment of the present invention is to provide a device which allows for the addition of a speaker to an existing automobile sound system without having to physically connect the speaker to the head unit of the automobile.

Another object of an embodiment of the present invention is to provide a device which sends audio data both to the head unit of an automobile and to a portable speaker that is not hard wired to the head unit.

Briefly, an embodiment of the present invention provides a device which is configured to receive a signal from a mobile device, pass that signal through to an automobile head unit, filter out and decode some audio-related information from the signal the device receives from the mobile device, determine a delay, combine that delay with the audio-related information to arrive at a speaker signal, and then wirelessly send that speaker signal to a speaker.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 3 provides a diagram of a system which incorporates a device which is in accordance with an embodiment of the present invention, wherein the device is disposed between an Apple device and an automobile head unit, is connected to both the Apple device and automobile head unit via a wired connection, and is configured to send audio-related signals to a portable speaker wherein Apple's CarPlay system is employed; and FIG. 4 provides a diagram of a system which incorporates a device which is in accordance with an embodiment of the present invention, wherein the device is disposed between an Apple device and an automobile head unit, is connected to both the Apple device and automobile head unit via a wireless connection, and is configured to send audio-related signals to a portable speaker, wherein Apple's CarPlay system is employed.

DESCRIPTION

Figure 1:
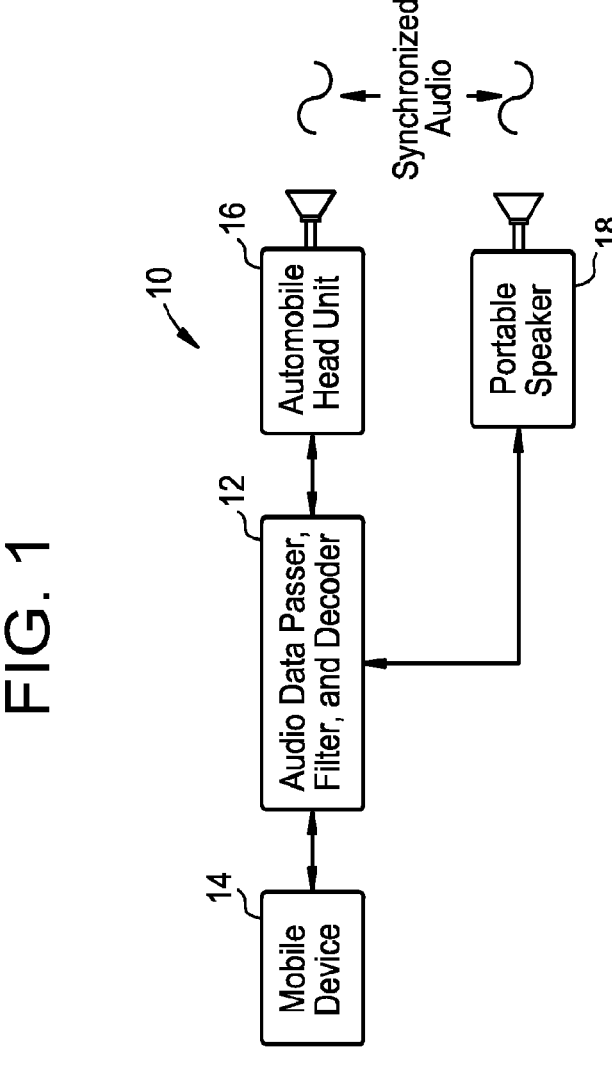
FIG. 1 provides a diagram of a system which incorporates a device which is in accordance with an embodiment of the present invention, wherein the device is an audio data passer, filter and decoder, is disposed between a mobile device and an automobile head unit, is in communication with both the mobile device and automobile head unit, and is configured to process data received from the mobile device and send audio-related signals to a portable speaker.

While this invention may be susceptible to embodiment in different forms, there are shown in the drawings and will be described herein in detail, specific embodiments with the understanding that the present disclosure is to be considered an exemplification of the principles of the invention and is not intended to limit the invention to that as illustrated.

FIG. 1 provides a diagram of a system 10 which incorporates a device 12 which is in accordance with an embodiment of the present invention. Specifically, the device 12 is an audio data passer, filter and decoder, the functionality of which will be described more fully hereinbelow.

As shown, the device 12 is disposed between a mobile device 14 and an automobile head unit 16 and is in communication with both the mobile device 14 and automobile head unit 16. The device 12 is configured to receive data from the mobile device 14 and pass that data on to the automobile head unit 16. In addition, the device 12 is configured to filter out and decode audio data from that data being received from the mobile device 14, and then send audio-related signals to a portable speaker 18. The device 12 is preferably also configured to add an appropriate delay to that audio data that is sent to the portable speaker 18 such that the portable speaker 18 emits audio that is synchronized with the audio being emitted by the head unit 16 through the automobile's speakers. Alternatively, instead of the device 12 being configured to add the appropriate delay, the portable speaker 18 could be configured to add the delay to provide synchronized audio relative to the audio that is being produced by the head unit 16. Preferably, all the components of the device 12 are contained in a single housing.

The connection between all the components could be wired or wireless. For example, the connection between the mobile device 14 and the device 12 that is disposed between the head unit 16 and the mobile device 14 could be a wired connection, such as a USB connection, or a wireless connection, such as Bluetooth and/or Wi-Fi. Similarly, the connection between the head unit 16 and the device 12 that is disposed between the head unit 16 and the mobile device 14 could be a wired connection, such as a USB connection, or a wireless connection, such as Bluetooth and/or Wi-Fi. Finally, the connection between the portable speaker 18 and the device 12 that is disposed between the head unit 16 and the mobile device 14 could be a wired connection, such as an audio cable, or a wireless connection, such as Bluetooth and/or Wi-Fi.

Furthermore, the mobile device 14 could take many forms. For example, the mobile device 14 could be an Apple brand product, such as an iPhone, iPad, iPod, etc. Alternatively, the mobile device 14 could be some other brand of mobile phone, tablet, MP3 player, etc., or basically any device that can output audio data, such as via USB, Wi-Fi, Bluetooth, etc.

Figure 2:
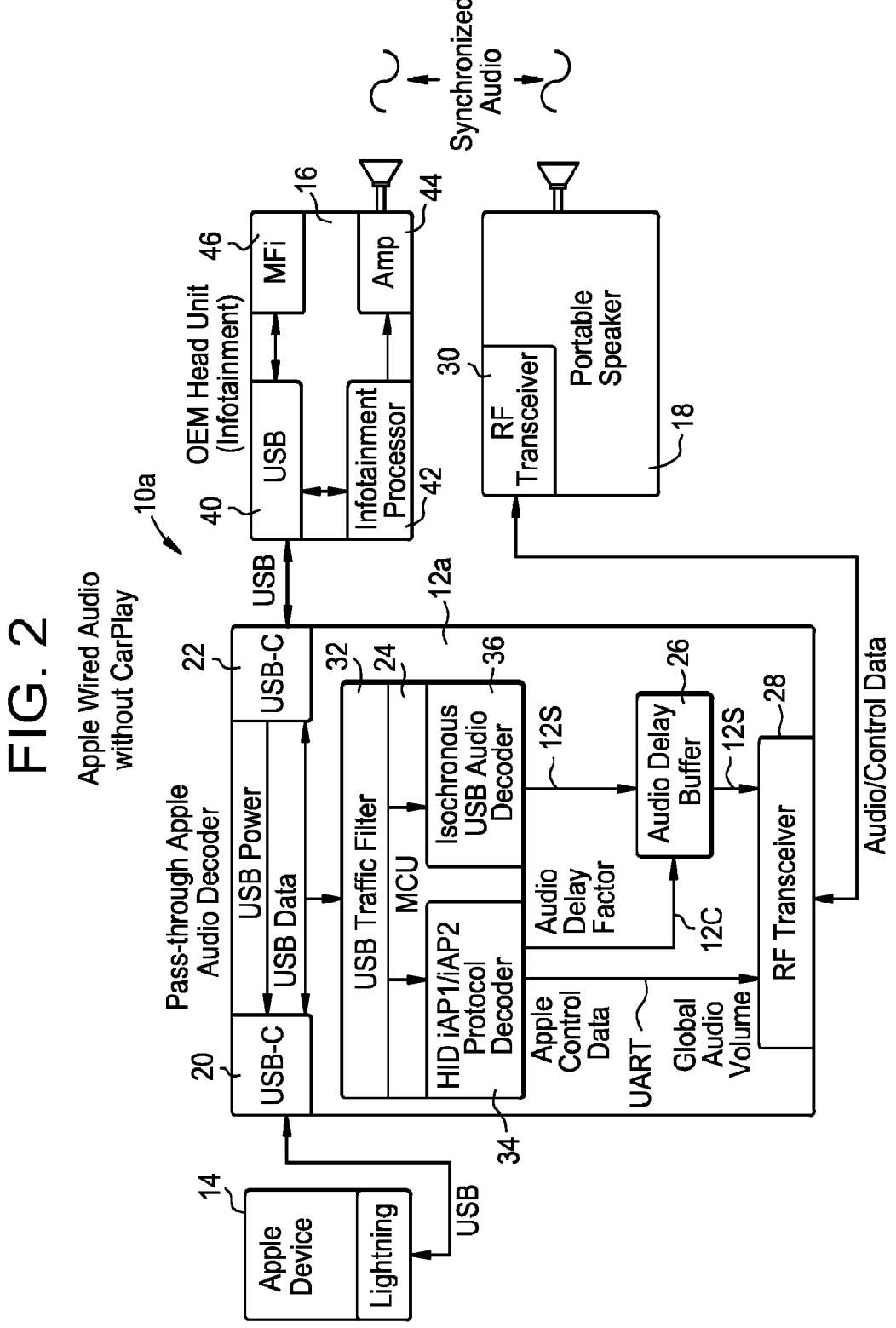
FIG. 2 provides a diagram of a system which incorporates a device which is in accordance with an embodiment of the present invention, wherein the device is disposed between an Apple device and an automobile head unit, is connected to both the Apple device and automobile head unit via a wired connection, and is configured to send audio-related signals to a portable speaker.
Figure 3:
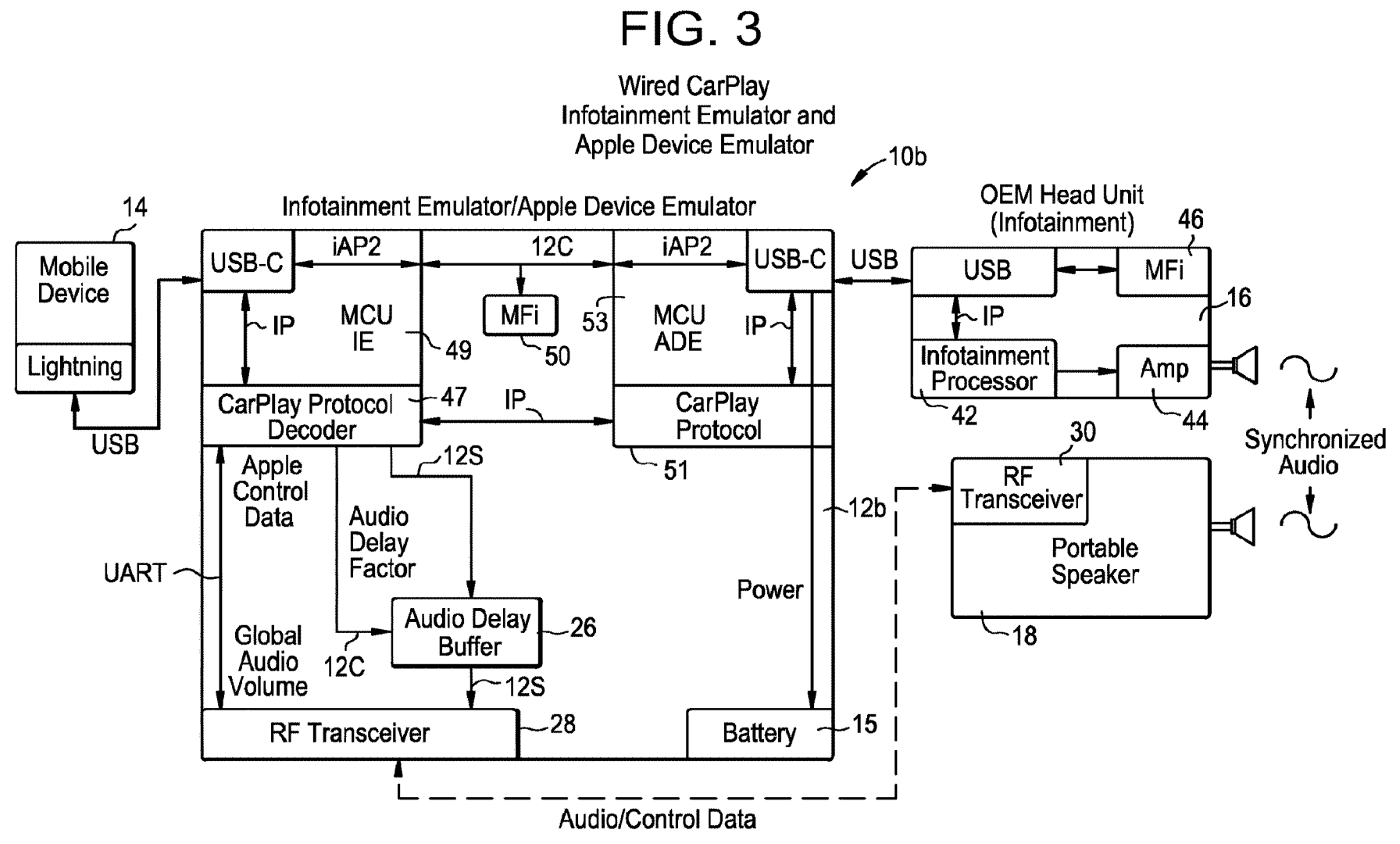
Figure 4:
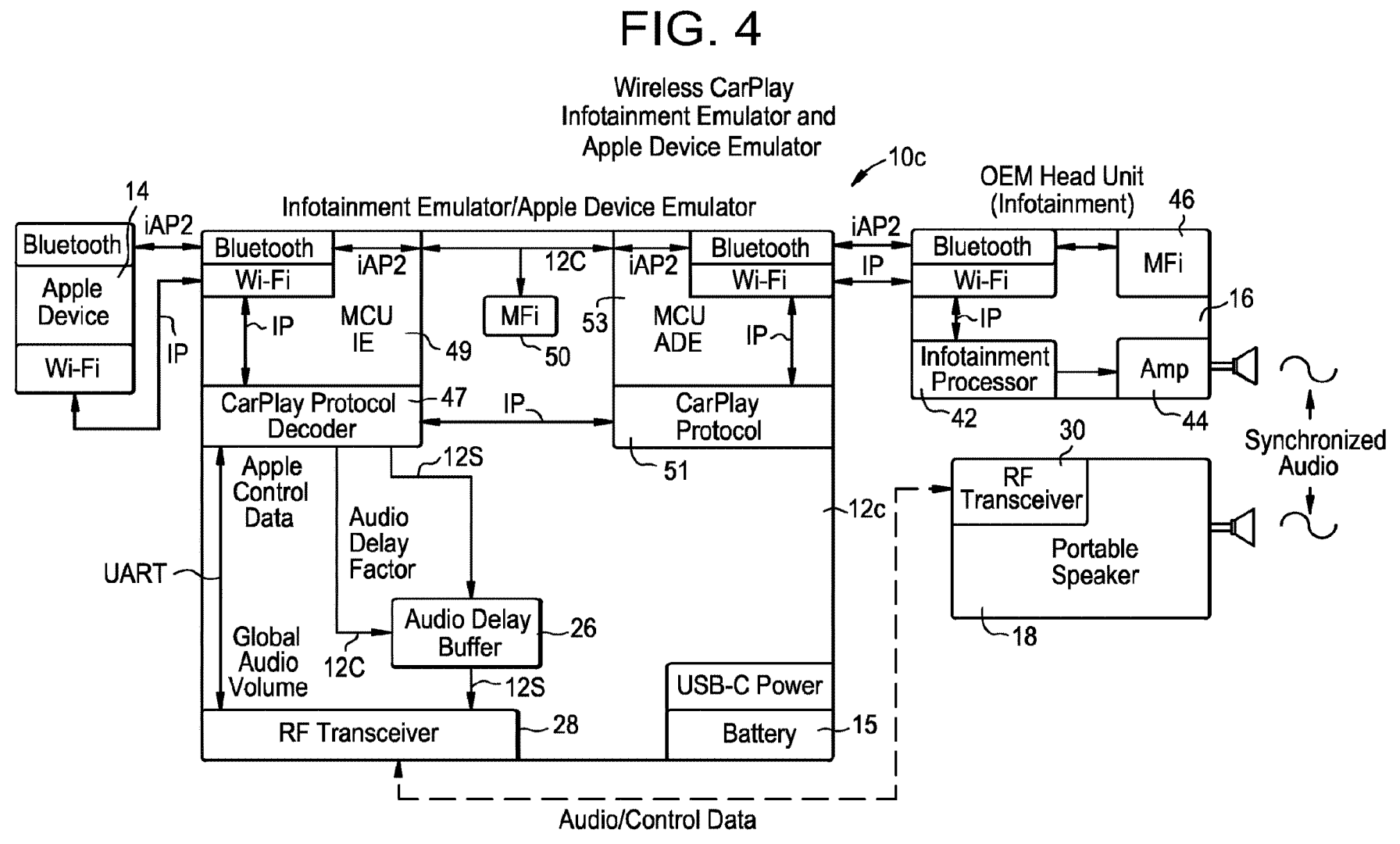

FIGS. 2-4 show specific examples of a few of these variations but are not intended to limit the scope of the present invention. FIGS. 2-4 will now be described.

FIG. 2 illustrates a system 10*a* where the device is connected to both to the mobile device and the head unit via wired connections, specifically USB connections, the mobile device is an Apple product (such as an iPhone, iPad, iPod, etc.), and Apple's CarPlay (described in more detail later hereinbelow) is not being employed.

Apple devices are known to communicate, for audio applications, with "accessories" (e.g., headphones, microphones, and automobile head units) over wired Universal Serial Bus (USB, as specified in "Universal Serial Bus Specification Revision 2.0" or later) connections using a subset of the standardized "USB audio class" ("Universal Serial Bus Device Class Definition for Audio Devices Release 1.0" or later), alongside a proprietary protocol referred to as "iAP2" in its current version, "iAP1" in its previous version, or "iAP" in general. With USB audio class openly documented and having numerous open-source implementations, and the subset of iAP concerning streaming audio and its metadata being relatively simple, passively monitoring communications between Apple devices and accessories is possible, for the purpose of allowing additional audio rendering devices to participate in audio streaming and be made aware of user interaction initiated from the Apple device or accessory.

In older Apple accessory implementations (typically using iAP1), the Apple device serves in the USB "peripheral" role and the accessory in the "host" role. Newer implementations (typically using iAP2) allow the Apple device to initially present to the accessory as a peripheral, and subsequently switch roles to host, as described in "On-The-Go Supplement to the USB 2.0 Specification, Revision 1.0a" or later. Such role switching can be detected and monitored appropriately.

The system 10*a* shown in FIG. 2 will now be described in detail, and then the systems 10*b* and 10*c* in FIGS. 3 and 4, respectively, will be described mainly focusing on the differences. Device 12 refers to any of 12*a*, 12*b*, or 12*c*, except where the distinction is significant, and the variant is specified.

As shown in FIG. 2, the system 10*a* comprises a mobile device 14, a device 12*a* which is in accordance with an embodiment of the present invention, an automobile head unit 16, and a portable speaker 18. FIG. 2 specifically shows the situation where the mobile device 14 comprises an Apple device (such as an iPhone, iPad, iPod, etc.) connected to the device 12*a* via a USB-C port 20, and wherein CarPlay is not being employed. The device 12*a* is also connected to the head unit 16 via a USB port 22 (i.e., using a cable). The portable speaker 18 is preferably configured to be able to respond to user interaction such as volume change, pause, play, and stop, and be aware of streaming audio metadata such as track position, artist, album, and track name.

As shown, the device 12 preferably comprises a Micro-controller (MCU) 24 as well as an Audio Delay Buffer 26 and an RF transmitter (more specifically, preferably the RF transmitter comprises an RF Transceiver 28 which is configured to both send RF signals to, and receive RF signals from, an RF Transceiver 30 in the portable speaker 18).

As shown in FIG. 2, the MCU 24 of the device 12*a* preferably includes a USB Traffic Filter 32, an HID iAP1/iAP2 Protocol Decoder 34, and an Isochronous USB Audio Decoder 36. As shown in FIG. 2, the USB bus is monitored by the MCU 24 (capable of the USB host role). Specifically, the USB Traffic Filter 32 is configured to identify traffic between the mobile device 14 and head unit 16.

The Isochronous USB Audio Decoder 36 is configured to extract signals from the USB audio class traffic and convert the signal to an I2S signal that is sent to the Audio Delay Buffer 26 (which is configured to add the appropriate delay) and then the signal is passed to the RF Transceiver 28. iAP traffic is extracted from the USB Human Interface Device (HID) class (Device Class Definition for Human Interface Devices (HID) Version 1.11 or later), and the protocol is decoded to monitor metadata and connection information (Apple Control Data). This data is passed, such as via UART or some other data transport, to the RF Transceiver 28 and is used to configure the Audio Delay Buffer 26 via I2C.

The portable speaker 18 includes an RF receiver (more specifically, preferably the RF transmitter comprises an RF Transceiver 30 which is configured to both receive RF signals from, and send RF signals to, the device 12). The portable speaker 18 emits audio that is time synchronized and volume synchronized with audio that emits from the head unit 16 through the automobile's speakers.

Audio synchronization between the portable speaker 18 and speakers driven by the head unit 16 may be accomplished by first ensuring that the wireless link between the portable speaker 18 and the device 12 has a latency lower than the delay between the head unit 16 receiving USB audio and the audio being rendered by the speakers connected to the head unit 16. The device 12 or portable speaker 18 then provides a configurable audio delay, so that extra delay can be added before audio is rendered by the portable speaker 18. The delay between the head unit 16 receiving USB audio and the audio being rendered by the speakers connected to the head unit 16 is disclosed by the head unit 16, as an Apple accessory, via iAP. Accessories are required to disclose this delay, so that Apple devices can synchronize video displayed on the Apple device, with audio rendered by the accessory, by delaying the video on the Apple device.

The head unit 16, in addition to the USB port 40, includes other components some of which are depicted in FIG. 2 (such as an Infotainment Processor 42, an amplifier (Amp) 44, and has hardware 46 that effectively equips the head unit with Made for iPhone (MFi) technology).

While FIG. 2 shows the situation where the mobile device is an Apple device and is wired to the device and CarPlay is not employed, FIGS. 3 and 4 show the situation where the mobile device is an Apple device and CarPlay is employed—FIG. 3 shows a wired connection and FIG. 4 shows a wireless connection. The devices 12a and 12b shown in FIGS. 3 and 4, respectively, may be the same. Given that the device 12 could be used in a wireless connection, preferably the device includes a rechargeable battery 15.

Apple devices and automobile head units support a feature marketed as "CarPlay", where mobile applications on the Apple device communicate audio, video, and various other data to the head unit, allowing users to interact with mobile applications running on the Apple device, using the head unit and connected speakers as a user interface, instead of the screen and speaker of the Apple device. CarPlay uses more complex protocols than the previously mentioned USB audio class and iAP.

CarPlay sessions are initially established over iAP2, but quickly switch to Internet Protocol (IP), Transmission Control Protocol (TCP), and User Datagram Protocol (UDP), over the USB, WLAN, or other "transport". Apple's "Bonjour" is used for IP address assignment and service discovery. A control channel utilizing RTSP (RFC 2326) supersedes iAP2 communication in controlling the CarPlay session. Although the audio stream itself, utilizing Linear Pulse Code Modulation (LPCM), is not encrypted, the control channel contains data exchanges that must be monitored to allow the portable speaker to participate in rendering streaming audio, be aware of user interaction, and synchronize with the audio rendered by the speakers connected to the head unit.

By design, iAP supports various transports. iAP over USB is supported by bulk data transfers over a HID class. When CarPlay is established via iAP2 over USB, the CarPlay session uses IP over USB. Another supported transport for iAP is Bluetooth, for wireless connections. When CarPlay is established over Bluetooth, the CarPlay session uses IP over WLAN, particularly the variant market as "Wi-Fi", specified by IEEE 802.11 n, ac, and later standards if supported.

The control channel of a CarPlay session is encrypted with industry-standard protocols and best practices. Therefore, the key used for symmetric encryption of control channel data is negotiated via Diffie-Hellman key exchange (U.S. Pat. No. 4,200,770A), or a variant thereof, such as D. J. Bernstein's Curve25519 (documented and specified at <https://cr.yp.to/ecdh.html>), so the previously mentioned "Pass-through Apple Audio Decoder" (see FIG. 2) is unable to ascertain the key, despite monitoring all traffic exchanged. RSA (U.S. Pat. No. 4,405,829A) is also used, for digital signature verification.

Monitoring the encrypted CarPlay control channel requires what is often referred to in computer security as "Man in the Middle". In this scenario (diagramed as "Wired CarPlay Infotainment Emulator and Apple Device Emulator" in FIG. 3 and "Wireless CarPlay Infotainment Emulator and Apple Device Emulator" in FIG. 4), the "Infotainment Emulator/Apple Device Emulator" 12b or 12c presents to the actual Apple device 14 as an accessory (in place of head unit 16) and to the actual head unit 16 as an Apple device (in place of Apple device 14). The CarPlay traffic is relayed from the CarPlay Protocol Decoder 47 of the MCU IE (Infotainment Emulator) 49 to the CarPlay Protocol aware device 51 of the "MCU ADE" (Apple Device Emulator) 53. Since the CarPlay Protocol Decoder 47 sees all traffic unencrypted, it's able to extract LPCM audio data, user interaction, and synchronization information, similar to the previously described "Pass-through Apple Audio Decoder" 12a. Audio data extracted from decoded CarPlay data is sent via I2S through a configurable Audio Delay Buffer 26 and then to the RF Transceiver 28. Apple Control Data is sent via UART to the RF Transceiver 28 and is used to configure the Audio Delay Buffer 26 via I2C. All CarPlay data is also sent from MCU IE 49 to MCU ADE 53. In this way, the "Wired CarPlay Infotainment Emulator and Apple Device Emulator" 12b and "Wireless CarPlay Infotainment Emulator and Apple Device Emulator" 12c allow the portable speaker 18 to participate in rendering streaming audio, be aware of user interaction, and synchronize with the audio rendered by the speakers connected to the head unit 16.

Apple ensures the quality of accessories that connect to its devices by requiring enrollment in a "Made For ipod/iphone/ipad" (MFi) program. The MFi program requires adherence to Apple accessory specifications and passing of Apple compliance testing procedures. To enforce MFi compliance, Apple devices authenticate accessories that connect to them. This authentication takes the form of challenge-response signature authentication of the accessory by the Apple device, over iAP. The accessory sends an X.509 (specified by International Telecommunications Union's "Standardization Sector") certificate (public key) to the Apple device. If the Apple device accepts the certificate, it responds with a challenge that the accessory must sign. The accessory must return a signature, which the Apple device verifies according to the previously received certificate. Cryptographic calculations are performed on the accessory with the help of a proprietary Application-Specific Integrated Circuit (ASIC) distributed and tightly controlled by Apple.

MFi authentication is performed when iAP communication is established. The Pass-through Apple Audio Decoder 12a (see FIG. 2) is not impeded by MFi authentication because the Apple device 14 communicates directly with the accessory (i.e., the head unit 16), so authentication is handled normally. The certificate, challenge, and signature are not needed for subsequent passive monitoring of USB audio class data or iAP transactions over USB HID related to user interaction and metadata.

The Apple Device Emulator 53 side of the "Wired CarPlay Infotainment Emulator and Apple Device Emulator" 12b and "Wireless CarPlay Infotainment Emulator and Apple Device Emulator" 12c may need to pass MFi authentication because accessories may authenticate the Apple device. An emulated Apple device 53 may allow any accessory to pass authentication; however, authentication of the Apple device 14 may be desired. Regardless, the Infotainment Emulator 49 side must pass MFi authentication to communicate with Apple device 14. The Wired and Wireless implementations both utilize an MFi chip 50 to authenticate with the Apple Device 14 (i.e., the Apple device 14 ensures the Emulator 49 is compliant), authenticate with the head unit 16 (i.e., the head unit 16 ensures the Emulator 53 is compliant) if necessary, and authenticate the Apple Device 14 (i.e., the Emulator 49 ensures that the Apple Device 14 is compliant) if desired.

As shown in FIGS. 1-4, preferably the connection to the portable speaker 18 is two-way, meaning information travels back and forth between the device 12 and the portable speaker 18. Status information such as power state, battery level, temperature, volume level, internal audio delay, etc. could be sent from the portable speaker 18 back to the device 12. Also, the portable speaker 18 could have at least three buttons on-board for volume and power control, and information relating to the settings could be sent back to the device 12. In an automobile environment, the user is not expected to be using the buttons that are on-board the portable speaker 18, but even so the user needs to interact with the device 12 and the device 12 could be employed in a non-automobile scenario where using the buttons on-board the portable speaker 18 could be more practical.

The device 12 will need status information from the portable speaker 18 to know what state the portable speaker 18 is in such as low-power stand-by, busy with direct user actions (such as selecting alternate audio inputs on portable speaker 18 or user configuration in progress), powering on or off, etc. There may also be some indicators on the device 12 to notify the user if the portable speaker 18 is in a state that requires user intervention, such as the device 12 may have LED indicators for portable speaker low battery, portable speaker 18 RF link disconnected, portable speaker 18 overheated, etc.

Some examples of what the portable speaker 18 buttons could do include volume up and down, track pause and resume, skipping to next track, Bluetooth pairing, and power on and off. Depending on the exact RF protocol that is used for the portable speaker 18/device 12 connection, there may be buttons for pairing that RF protocol that will be different than the button(s) for Bluetooth pairing.

Regardless of whether the connections are wired or wireless, and regardless of whether the mobile device is an Apple product or not, a device in accordance with an embodiment of the present invention is configured to receive a signal from a mobile device, pass that signal through to an automobile head unit, filter out and decode some audio-related information from the signal the device receives from the mobile device, and pass that audio-related information to a portable speaker (with or without a delay).

Apple, Bluetooth, iPad, iPhone, iPod and CarPlay are all registered trademarks of their respective owner(s). Apple is brand of electronic devices, Bluetooth is a certain type of wireless connection, an iPhone is a smart phone, an iPad is a tablet personal computer, an iPod is a portable media player, and CarPlay is a feature in cars (and some aftermarket car stereos) that allows a user to connect a smart phone or tablet personal computer and control and view certain applications on either device through the dashboard's media system, including moving-map navigation functionality.

While specific embodiments of the invention have been shown and described, it is envisioned that those skilled in the art may devise various modifications without departing from the spirit and scope of the present invention.

What is claimed is:

1. A device for use with a mobile device, an automobile head unit and a portable speaker, said device comprising a data receiver configured to receive data from the mobile device; a data passer configured to pass data to the automobile head unit; and a filter and decoder configured send audio-related signals to the portable speaker, wherein the device is configured to add an appropriate delay to the audio-related signals that the device sends to the portable speaker such that the portable speaker emits audio that is synchronized with audio emitted by the automobile head unit through automotive speakers, wherein the device comprises a Microcontroller (MCU), an Audio Delay Buffer and an RF transmitter, wherein the MCU is configured to send signals to the Audio Delay Buffer, the Audio Delay Buffer is configured to add the appropriate delay and then send signals to RF transmitter, wherein the RF transmitter is configured to send RF signals to the portable speaker such that the portable speaker emits audio that is synchronized with audio emitted by the automobile head unit through automotive speakers, wherein the MCU comprises a USB Traffic Filter, an HID iAP1/iAP2 Protocol Decoder, and an Isochronous USB Audio Decoder, wherein the USB Traffic Filter identifies traffic between the mobile device and the automobile head unit, wherein the Isochronous USB Audio Decoder extracts a signal, converts the signal to an I2S signal, and sends that I2S signal to the Audio Delay Buffer which adds the appropriate delay and passes the signal to the RF transmitter.

2. A device as recited in claim 1, wherein the device is configured to connect to the mobile device via a wired connection.

3. A device as recited in claim 1, wherein the device is configured to connect to the mobile device via a wireless connection.

4. A device as recited in claim 3, wherein the device is configured to connect to the mobile device via Bluetooth or Wi-Fi.

5. A device as recited in claim 1, wherein the device is configured to connect to the automobile head unit via a wired connection.

6. A device as recited in claim 1, wherein the device is configured to connect to the automobile head unit via a wireless connection.

7. A device as recited in claim 6, wherein the device is configured to connect to the automobile head unit via Bluetooth or Wi-Fi.

8. A device as recited in claim 1, wherein the device is configured to connect to the portable speaker via a wired connection.

9. A device as recited in claim 8, wherein the device is configured to connect to the portable speaker via an audio cable.

10. A device as recited in claim 1, wherein the device is configured to connect to the portable speaker via a wireless connection.

11. A device as recited in claim 10, wherein the device is configured to connect to the portable speaker via Bluetooth or Wi-Fi.

12. A device as recited in claim 1, wherein the device is configured to work with Apple CarPlay and comprises a CarPlay Protocol Decoder and a CarPlay Protocol aware device, wherein the CarPlay Protocol Decoder sends signals to the Audio Delay Buffer and the CarPlay Protocol aware device.

13. A device for use with a mobile device, an automobile head unit and a portable speaker, said device comprising a data receiver configured to receive data from the mobile device; a data passer configured to pass data to the automobile head unit; and a filter and decoder configured send audio-related signals to the portable speaker, wherein the device is configured to add an appropriate delay to the audio-related signals that the device sends to the portable speaker such that the portable speaker emits audio that is synchronized with audio emitted by the automobile head unit through automotive speakers, wherein the device comprises a Microcontroller (MCU), an Audio Delay Buffer and an RF transmitter, wherein the MCU is configured to send signals to the Audio Delay Buffer, the Audio Delay Buffer is configured to add the appropriate delay and then send signals to RF transmitter, wherein the RF transmitter is configured to send RF signals to the portable speaker such that the portable speaker emits audio that is synchronized with audio emitted by the automobile head unit through automotive speakers, wherein the MCU comprises a USB Traffic Filter, and an Isochronous USB Audio Decoder, wherein the USB Traffic Filter identifies traffic between the mobile device and the automobile head unit, wherein the Isochronous USB Audio Decoder extracts a signal, converts the signal to an I2S signal, and sends that I2S signal to the Audio Delay Buffer which adds the appropriate delay and passes the signal to the RF transmitter.

14. A device as recited in claim 13, wherein the device is configured to connect to the mobile device via a wired connection.

15. A device as recited in claim 13, wherein the device is configured to connect to the mobile device via a wireless connection.

16. A device as recited in claim 15, wherein the device is configured to connect to the mobile device via Bluetooth or Wi-Fi.

17. A device as recited in claim 13, wherein the device is configured to connect to the automobile head unit via a wired connection.

18. A device as recited in claim 13, wherein the device is configured to connect to the automobile head unit via a wireless connection.

19. A device as recited in claim 18, wherein the device is configured to connect to the automobile head unit via Bluetooth or Wi-Fi.

20. A device as recited in claim 13, wherein the device is configured to connect to the portable speaker via Bluetooth or Wi-Fi.

* * * * *